US011650882B1

(12) United States Patent
Urs et al.

(10) Patent No.: US 11,650,882 B1
(45) Date of Patent: May 16, 2023

(54) METHOD AND SYSTEM FOR PERFORMING RENAME OPERATIONS DURING DIFFERENTIAL BASED BACKUPS IN STORAGE DEVICES

(71) Applicant: Dell Products L.P., Round Rock, TX (US)

(72) Inventors: Deepthi Urs, Bangalore (IN); Shraddha Chunekar, Indore (IN); Adrian Dobrean, Oakville (CA); Navneet Upadhyay, Greater Noida (IN); Sunder Ramesh Andra, Bangalore (IN); Amith Ramachandran, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/530,537

(22) Filed: Nov. 19, 2021

(51) Int. Cl.
*G06F 11/00* (2006.01)
*G06F 11/14* (2006.01)

(52) U.S. Cl.
CPC ...... *G06F 11/1435* (2013.01); *G06F 11/1423* (2013.01); *G06F 11/1451* (2013.01); *G06F 11/1464* (2013.01); *G06F 11/1469* (2013.01)

(58) Field of Classification Search
CPC ............. G06F 11/1435; G06F 11/1423; G06F 11/1451; G06F 11/1464; G06F 11/1469
See application file for complete search history.

(56) References Cited

U.S. PATENT DOCUMENTS

| | | | |
|---|---|---|---|
| 9,020,987 B1 * | 4/2015 | Nanda ................. | G06F 16/1734 707/821 |
| 9,342,550 B1 * | 5/2016 | Manmohan ......... | G06F 21/6218 |
| 2016/0210342 A1 * | 7/2016 | Vallabhaneni .......... | G06F 3/061 |
| 2021/0049079 A1 | 2/2021 | Kumar et al. | |
| 2022/0004461 A1 * | 1/2022 | Jain ..................... | G06F 11/1469 |
| 2022/0318099 A1 * | 10/2022 | Kotwal ............... | G06F 11/1435 |

* cited by examiner

*Primary Examiner* — Joseph D Manoskey
(74) *Attorney, Agent, or Firm* — Chamberlain, Hrdlicka, White, Williams & Aughtry (57) ABSTRACT

In general, embodiments relate to a method for performing rename operations, the method comprising: obtaining a rename list from a snapshot difference report, sorting the rename list to obtain an ordered rename list, making a determination using the ordered rename list that circular rename entries exist in the ordered rename list, based on the determination, creating a plurality of temporary target paths based on the circular rename entries, generating a temporary rename list of the rename operations, generating a circular rename list of the rename operations, performing rename operations in the temporary rename list, and after completing operations in the temporary rename list, performing rename operations in the circular rename list.

20 Claims, 6 Drawing Sheets

METHOD AND SYSTEM FOR PERFORMING RENAME OPERATIONS DURING DIFFERENTIAL BASED BACKUPS IN STORAGE DEVICES

BACKGROUND

Computing devices often exist in ecosystems that include any number of devices. Devices in such a device ecosystem may perform a variety of workloads. In certain scenarios, data from such devices may be backed up to a target data domain. However, for large data sets (e.g., a Hadoop Distributed File System), full backups of all data may be expensive (e.g., time-consuming, resource intensive, etc.).

BRIEF DESCRIPTION OF DRAWINGS

Certain embodiments discussed herein will be described with reference to the accompanying drawings. However, the accompanying drawings illustrate only certain aspects or implementations of embodiments described herein by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase "operatively connected" may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for performing a rename operation during differential based backups of source data in accordance with one or more embodiments described herein. More specifically, embodiments relate to preventing operation sequence related problems (e.g., problems during a circular rename operation) and unnecessary steps during a rename operation (see e.g., FIGS. 3B and 3C). Thus, embodiments provide a more robust rename operation.

In one or more embodiments, a collection of one or more source devices generate, obtain, and/or otherwise store data. As an example, an instance of Hadoop may include any number of source nodes, in which exists a Hadoop distributed file system (HDFS). To protect such data, backup instances of the data may be generated and stored in a storage device, such as a target data domain storing any number of backups from any number of source devices. However, backing up all of the data from the one or more source devices may be expensive in a variety of ways, such as, for example, time, resource usage, cost, etc. To address at least the aforementioned problem with generating full backup copies of source data, while still maintaining point-in-time full backup copies of source data, snapshots of the data are used to create snapshot difference reports, which are then used to transform and sync a copy of a previous backup into a current synthetic full backup without having to copy all of the source data to a data domain. More specifically, during a backup operation (e.g., prior to the copying of data to the data domain), a snapshot of the data may be generated on the source device(s).

In one or more embodiments, a snapshot is a point-in-time copy of a file system. In one or more embodiments, two snapshots are used to generate the snapshot difference report (see e.g., FIG. 3A). In one or more embodiments, the snapshot difference report includes, but is not limited to, information indicating the portions (i.e., files, folders, etc.) of the source data that were deleted since the last backup, renamed since the last backup, created since the last backup and/or modified since the last backup.

Transformation of the copy of the previous backup into the current synthetic full backup using a corresponding snapshot difference report seems promising for data protection; however, conventional approaches to generating a difference copy list based on the generated snapshot difference report is challenging. According to the conventional approaches, during the transformation, various operations can be applied to a particular file and/or directory without enforcing any sequence of the operations. In addition to that, the snapshot difference report does not provide any mechanism to not guarantee execution of a particular operation sequence.

These factors may cause one or more of the following problems to occur during a rename operation, which might affect the source data being copied to the data domain.

Potential Problem 1: A rename operation is performed on a child path (i.e., rename directory1/subdirectory1 (dir1/sub1) to directory1/subdirectory2 (dir1/sub2)) before performing the rename operation on a parent path (i.e., rename dir1 to directory2 (dir2)) and entries in the snapshot difference report (i.e., first rename dir1 to dir2, then rename dir1/sub1 to dir2/sub2) are different from the sequence of the performed rename operation. In this example, it has shown that the rename operation is performed on the child path before performing the rename operation on the parent path, which is a different sequence of operations then the sequence of operations specified in the snapshot difference report.

Potential Problem 2: A set of circular rename operations (i.e., rename file1 and/or folder1 (f1) to file0 and/or folder0 (f0), then rename file3 and/or folder3 (f3) to f1, then rename file2 and/or folder2 (f2) to f3, and then rename f0 to f2) is performed. In this scenario, the snapshot difference report entries resulting from this set of circular rename operations are "rename f1 to f2" (because f1 is changed to f0 and f0 is changed to f2, so the effective rename operation was f1 to f2), "rename f2 to f3", and "rename f3 to f1". In this example, even if the sequence of rename operations matches the sequence of operations in the snapshot difference report, the result of the rename operation will be incorrect. Specifically, the rename operation will fail, because the file and/or folder (e.g., f1, f2, f3, etc.) that has to be renamed already exists in the target path. Additionally, when a the rename operation renames f1 to f2 and f2 to f3, basically, f2 is now what was previously f1 and the result of performing the rename operation is overwriting with f3, which means there is no way to rename the f3 again (because the original f3 disappears) and consequently, all the files become f1, which is not the intended outcome.

Potential Problem 3: A rename operation is performed on a parent path (i.e., rename dir1 to dir2) before performing the rename operation on a child path (i.e., rename dir2/sub1 to dir2/sub2) and entries in the snapshot difference report (i.e., first rename dir1/sub1 to dir2/sub2, then rename dir1 to dir2) are different from the sequence of the performed rename operation. In this example, it has shown that the snapshot difference report may not result in the same operation sequence. In addition, when the rename operation is first performed on the parent path and the child path of the new parent path is renamed, the child path of the new parent will specify the old parent path.

To this end, embodiments of the invention provide a mechanism to address one or more of the aforementioned problem.

Figure 1:
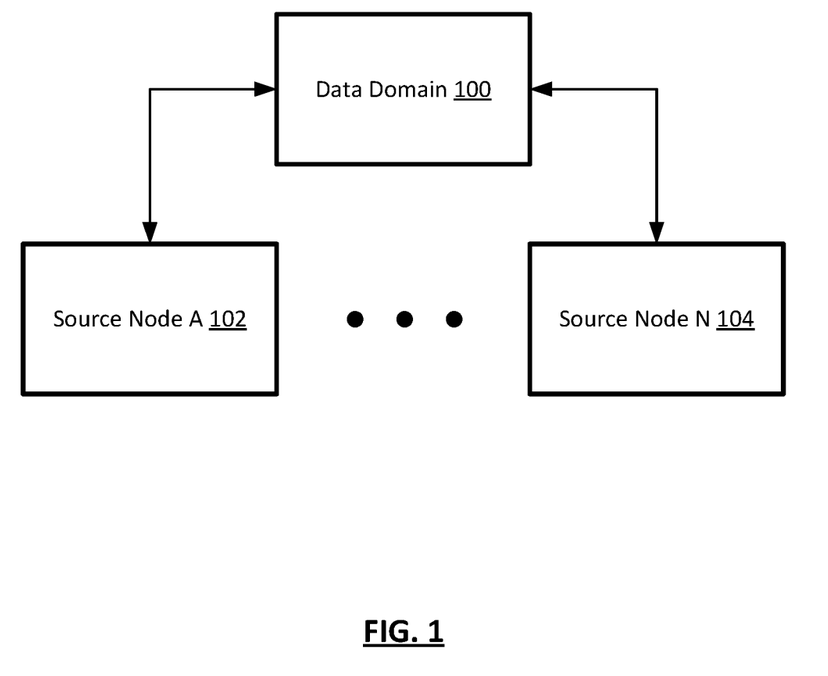
FIG. 1 shows a diagram of a system in accordance with one or more embodiments described herein.

FIG. 1 shows a diagram of a system in accordance with one or more embodiments described herein. The system may include a data domain (100) operatively connected to any number of source nodes (e.g., source node A (102), source node N (104)). Each of these components is described below.

In one or more embodiments, the source nodes (102, 104) may be computing devices. In one or more embodiments, as used herein, a source node (102, 104) is any computing device, collection of computing devices, portion of one or more computing devices, or any other logical grouping of computing resources. In one or more embodiments, a source node (102, 104) is part of a device ecosystem, which may include any number of nodes, devices, components, etc. In one or more embodiments, a device ecosystem is a collection of devices, components, etc. arranged and/or operatively connected in any manner, and in which any number of workloads may be executed. One example of a device ecosystem is a Hadoop instance (e.g., a Hadoop cluster), which may include any number of source nodes (102, 104). Other types of device ecosystems may be used without departing from the scope of embodiments described herein.

In one or more embodiments, as discussed above, a source node (102, 104) may be a computing device, a portion of a computing device, a set of computing devices, etc. In one or more embodiments, a computing device is any device, portion of a device, or any set of devices capable of electronically processing instructions and may include, but is not limited to, any of the following: One or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), one or more data processing units (DPUs), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or source node (102, 104). Other types of computing devices may be used without departing from the scope of embodiments described herein.

In one or more embodiments, the non-volatile storage (not shown) and/or memory (not shown) of a computing device or system of computing devices may be and/or include one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Furthermore, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, source nodes (102, 104) store data, which the source nodes may generate or otherwise obtain. As an example, the source nodes (102, 104) may be configured as a Hadoop cluster. As such, the source nodes may collectively store a HDFS, which may be referred to as source data. Source nodes are discussed further in the description of FIG. 2 below.

In one or more embodiments, the system also includes a data domain (100). In one or more embodiments, the data domain (100) is operatively connected to the source nodes (102, 104). In one or more embodiments, the data domain (100) includes one or more computing devices (described above). In one or more embodiments, a data domain (100) includes any amount of data storage of any type for storing data in any form. In one or more embodiments, the data domain (100) stores any number of backup copies of the source data of the source nodes (102, 104). At least a portion of the backup copies of the source data stored in the data domain are synthetic full backups created, at least in part, using techniques described herein. In one or more embodiments, a data domain (100) to which source data is backed up may be referred to as a target data domain.

In one or more embodiments, the source nodes (102, 104) and the data domain (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1 shows a configuration of components, other configurations may be used without departing from the scope of embodiments described herein. Accordingly, embodiments disclosed herein should not be limited to the configuration of components shown in FIG. 1.

Figure 2:
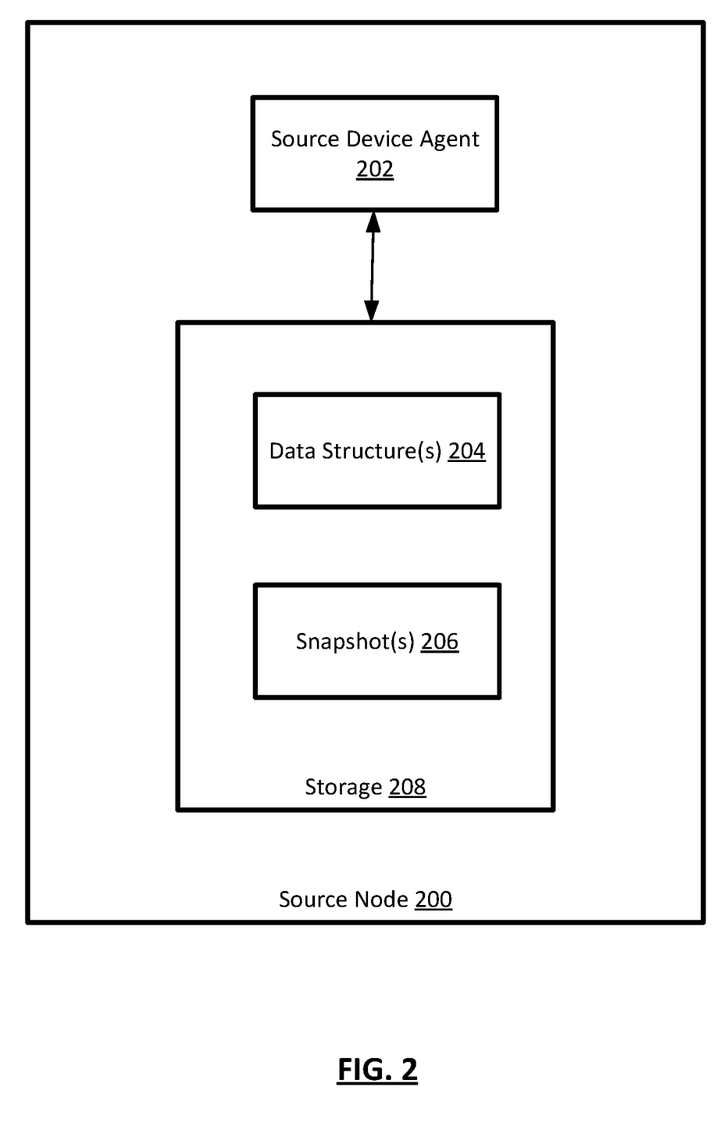
FIG. 2 shows a diagram of a source device in accordance with one or more embodiments described herein.

FIG. 2 shows a diagram of a source node (200) in accordance with one or more embodiments described herein. Source node (200) may include any number of components. As shown in FIG. 2, the source node (200) includes a source device agent (202) and storage (208). In one or more embodiments, the storage (208) includes data structure(s) (204) and snapshot(s) (206). Each of these components is described below.

Source node (200) may be similar, at least in part, to source nodes (102, 104) shown in FIG. 1 and discussed above. However, embodiments of the invention do not require that all source nodes are the same, or that all source nodes perform the same functionality. Instead, in one or more embodiments, certain source nodes (e.g., source node (200)) may be configured to perform additional, less, and/or different functionality and/or components. As an example, a device ecosystem may include any number of virtual machines configured as a Hadoop cluster. Each such virtual machine may be considered a source node, although the virtual machines perform different roles (e.g., master node, worker node, client node, name node, data node, etc.) within the Hadoop cluster, because each such virtual machine may include, contribute to, manage, etc. part of the HDFS (i.e., the source data to be backed up) associated with the Hadoop cluster. Thus, in one or more embodiments, at least one source node in the device ecosystem that includes the source nodes may be as shown in FIG. 2 (i.e., source node (200)) and described herein, but all source nodes need not be. In one or more embodiments, source nodes have in common that they store and/or are associated with data (e.g., a HDFS) that is to be backed up to a data domain (e.g., data domain (100) of FIG. 1) from time to time.

In one or more embodiments, a source node (200) is a computing device, as discussed above in the description of FIG. 1.

In one or more embodiments, the source node (200) includes a source device agent (202). In one or more embodiments, a source device agent (202) is any hardware (e.g., circuitry), software, firmware, or any combination thereof that includes functionality to generate snapshots of source data, to produce difference reports using two such snapshots, and to perform operations on a copy of a previous backup stored in a data domain based on a snapshot difference report. The source device agent (202) may perform any other functionality (e.g., implementing protocols, services, features, etc. for a source node) without departing from the scope of embodiments described herein. One of ordinary skill in the art, having the benefit of this Detailed Description, will appreciate that a source device agent (202) may be computing device hardware (e.g., processor(s) memory, storage, etc.) on which computer readable program code executes to perform operations as described herein. One of ordinary skill in the art will further appreciate that a source device agent cannot exist solely as computer readable program code, as it is the combination of such program code with relevant hardware of the underlying computing device (e.g., source node 200) to create a special purpose computing device that allows for the program code, when executed using said hardware, to perform functionality as described herein. Such program code may be stored, for example, in any tangible, non-transitory computer readable medium of the source node (200) to be accessed and executed to implement the source device agent (202). Certain aspects of functionality of the source device agent (202) is discussed further in the description of FIGS. 3A-3C below.

In one or more embodiments, the source device agent (202) is operatively connected to storage (208) of the source node (200). In one or more embodiments, the storage (208) is a data repository. In one or more embodiments, a data repository is any type of storage unit and/or device (e.g., a file system, database, collection of tables, RAM, and/or any other storage mechanism or medium) for storing data. Furthermore, the data repository may include multiple different storage units and/or devices. The multiple different storage units and/or devices may or may not be of the same type or located at the same physical location.

In one or more embodiments, the storage (208) of source node (200) includes any number of data structures (204). In one or more embodiments, a data structure (204) is any format or organization of data, such as, for example, all or any portion of a file system (e.g., a HDFS). In one or more embodiments, the data structure (204) stores at least a portion of the source data to be backed up to a data domain.

In one or more embodiments, the storage (208) also includes snapshot(s) (206). In one or more embodiments, a snapshot is a point-in-time copy of a file system (e.g., a HDFS). Snapshot(s) (206) may include any number of snapshots, each corresponding to a point-in-time. In one or more embodiments, a snapshot of the current state of a file system may be referred to as a current snapshot. In one or more embodiments, a snapshot of a file system at a prior point-in-time may be referred to as a previous snapshot. One or more snapshots of the snapshot(s) (206) may correspond to a backup copy of the file system stored in a data domain. As an example, a snapshot may be generated by a source device agent (202) and used to perform an initial full backup of the file system to which the snapshot corresponds. As another example, a snapshot may be generated by a source device agent (202) sometime after an initial full backup has been performed using a previous snapshot that represents the current state of the file system, and such a snapshot may be used in generating a synthetic full backup using techniques described herein.

While FIG. 2 shows a configuration of components, other configurations may be used without departing from the scope of embodiments described herein. For example, although FIG. 2 shows all components as part of the same device, any of the components may be grouped in sets of one or more components which may exist and execute as part of any number of separate and operatively connected devices. As another example, a single component may be configured to perform all or any portion of the functionality performed by the components shown in FIG. 2. Accordingly, embodiments disclosed herein should not be limited to the configuration of components shown in FIG. 2.

Figure 3A:
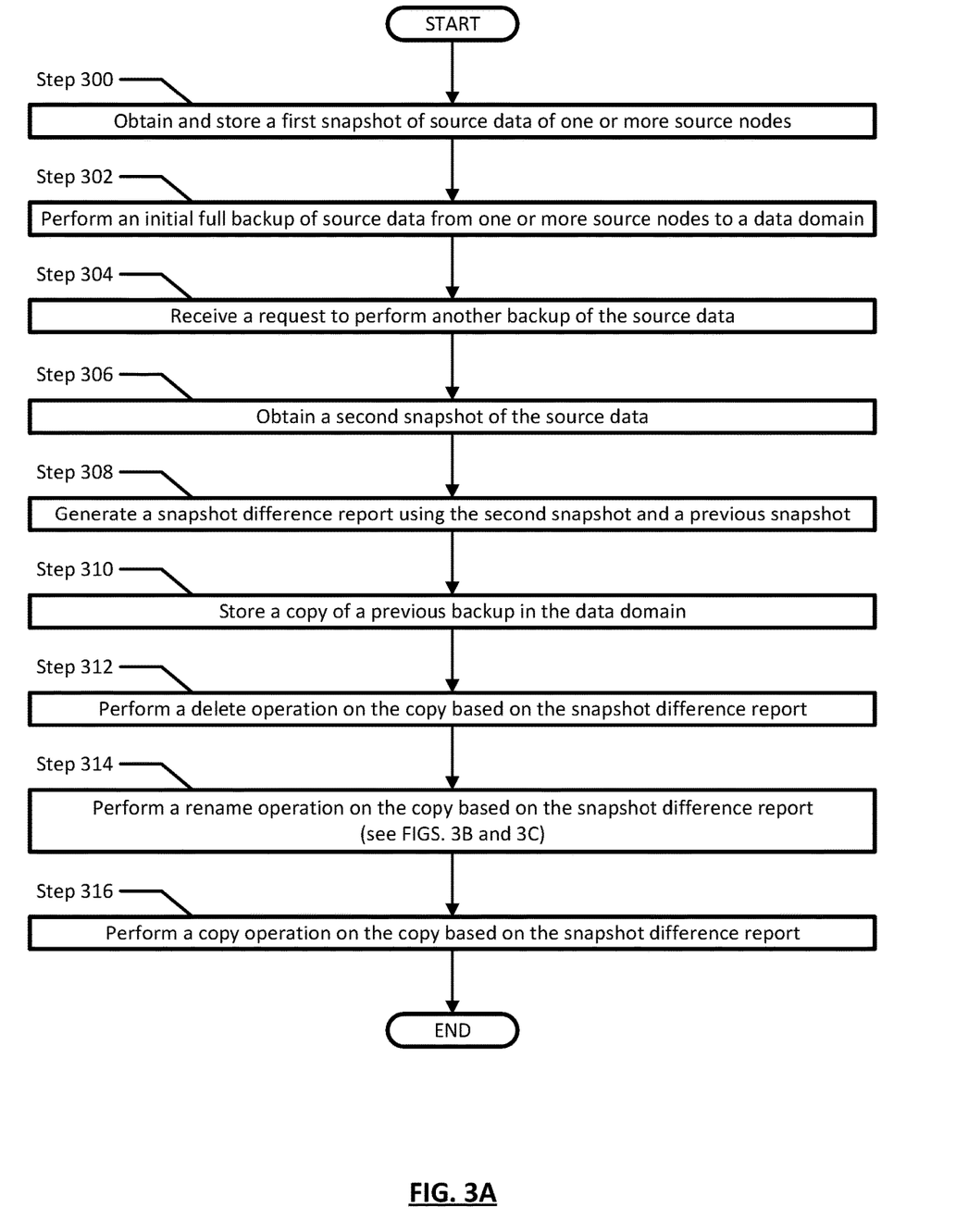
FIGS. 3A-3C show flowcharts of a method for rename operation during differential based backups in accordance with one or more embodiments described herein.
Figure 3B:
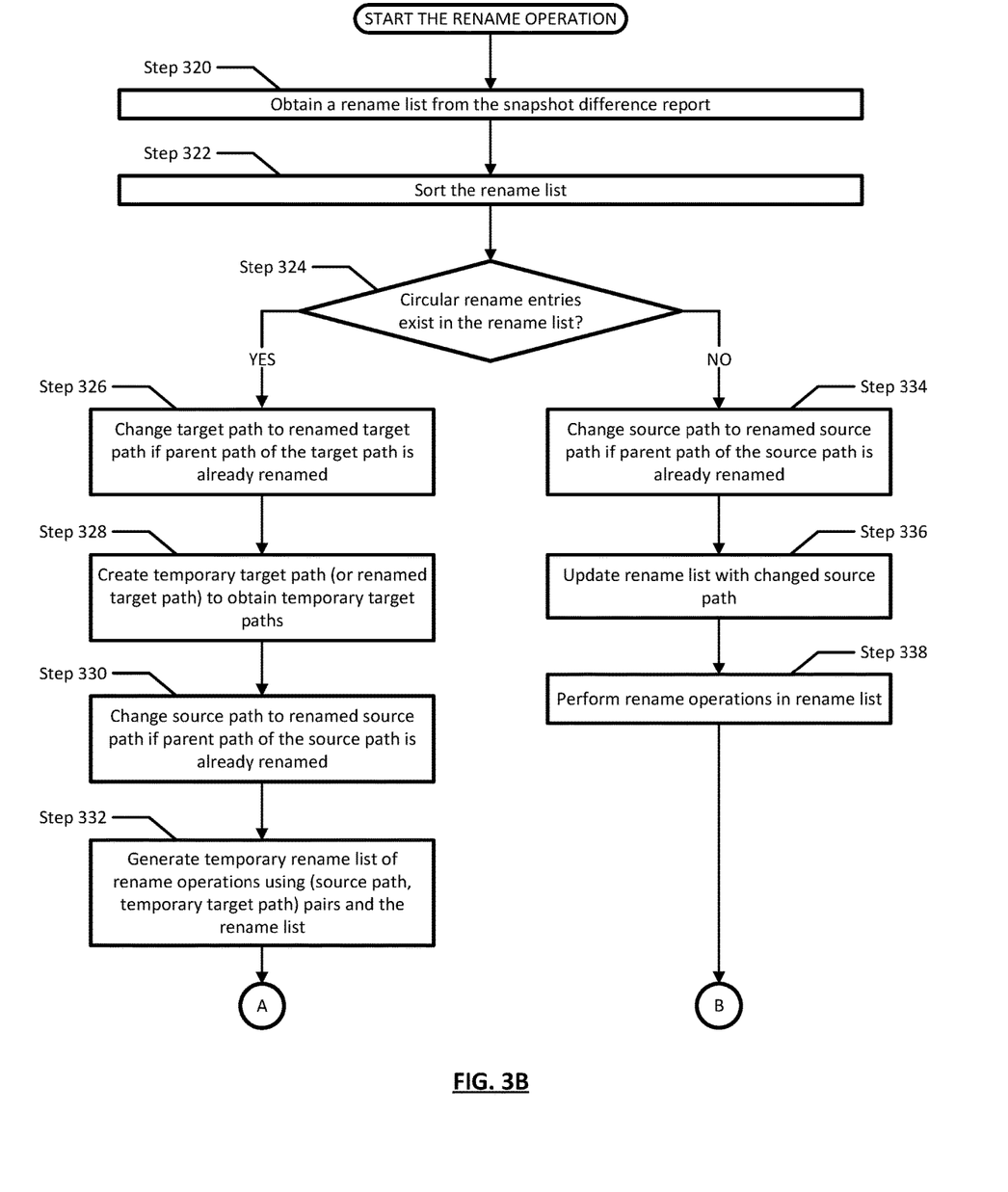
Figure 3C:
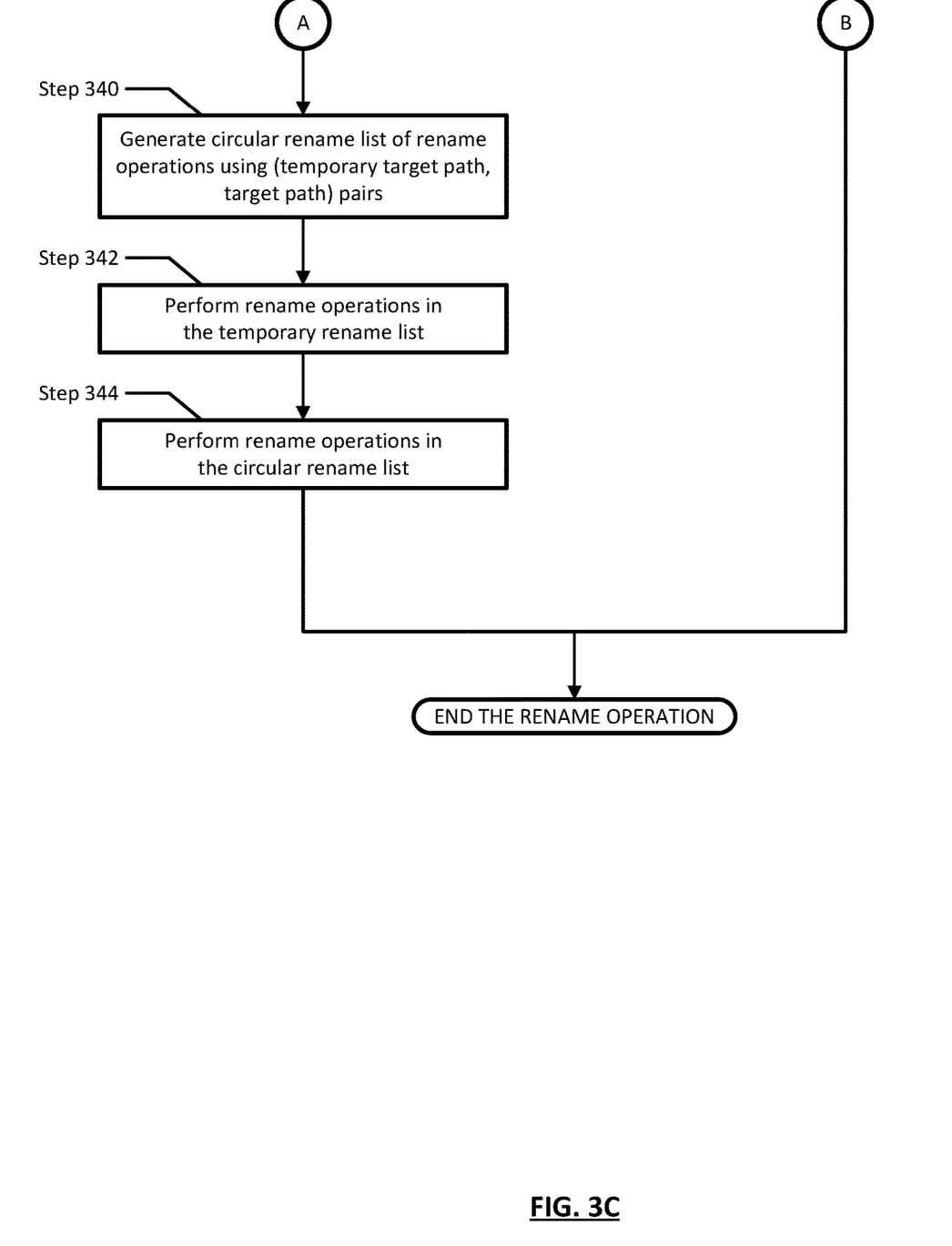

FIGS. 3A-3C show flowcharts of a method for rename operation during differential based backups in accordance with one or more embodiments described herein.

While the various steps in the flowchart shown in FIGS. 3A-3C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIGS. 3A-3C.

Turning to FIG. 3A, in Step 300, a first snapshot of source data is obtained and stored in storage of a source device. In one or more embodiments, a snapshot includes metadata associated with the source data. As an example, a snapshot may be a HDFS snapshot of a HDFS of a Hadoop cluster. In one or more embodiments, a snapshot is obtained by a source device agent executing on a source node generating the snapshot based on the source data. Source data may be all or any portion of data stored in any number of source devices. As such, a snapshot of source data may be a snapshot of all or any portion of such data. As an example, a HDFS snapshot may be a snapshot of all or any portion of a HDFS.

In Step 302, an initial full backup of the source data to a data domain is performed. In one or more embodiments, the initial full backup is a backup of all of the source data to any number of target data domain devices of a data domain. The initial full backup may be performed by creating a copy of the source data (e.g., a HDFS) stored in a data domain. In one or more embodiments, the initial full backup includes any amount of metadata (e.g., permissions, attributes, etc.) associated with the files and/or folders of the source data. In one or more embodiments, the initial full backup is performed using the snapshot generated in Step 300.

Between Steps 302 and 304, the source device agent may perform the steps in FIG. 3A, which ultimately results in the generation and storage of one or more synthetic full backups on the data domain. Further, as part of performing these steps, one or more snapshots may be stored on the source node.

At some later point-in-time, in Step 304, a request is received to perform another backup of the source data to the data domain. In one or more embodiments, the request is received by the source device agent of the source node. The request may be initiated, for example, by a user of the source nodes. As another example, the request may be initiated automatically pursuant to a configured backup schedule associated with the source data.

In Step 306, a second snapshot of the source data is obtained. In one or more embodiments, the second snapshot is obtained by a source device agent of a source node. In one or more embodiments, the second snapshot is a point-in-time copy of the file system of the source data at the point-in-time the snapshot is generated, which is later in time than the snapshot created in Step 300 prior to the initial full backup. The second snapshot may be referred to as a current snapshot of the source data.

In Step 308, a snapshot difference report is generated. In one or more embodiments, the snapshot difference report is generated by a source device agent of a source node. In one or more embodiments, the snapshot difference report is generated using the second snapshot obtained in Step 306 and a previous snapshot of the source data associated with a previous point-in-time. In one or more embodiments, the previous snapshot is the first snapshot obtained in Step 300 and used to perform the initial full backup of the source data. In one or more embodiments, the previous snapshot is a snapshot of the source data at a point-in-time later than the first snapshot (e.g., taken between Steps 302 and 304), but prior to the second snapshot. In one or more embodiments, the previous snapshot is a snapshot of the source data taken prior to the last backup of the source data to the target domain before the second snapshot is generated. In one or more embodiments, the previous snapshot was used to perform the last backup prior to the obtaining of the second snapshot (i.e., at an earlier point-in-time). In one or more embodiments, the previous snapshot was used to generate a previous synthetic full backup.

In one or more embodiments, the snapshot difference report represents the differences in the source data from the time the previous snapshot was obtained and the time the second (i.e., current) snapshot was obtained. In one or more embodiments, the differences between the snapshots are represented in the snapshot difference report associated with four operations: delete, rename, create, and modify. In one or more embodiments, the snapshot difference report includes a listing of files and/or folders that were deleted from the source data since the previous snapshot was taken. In one or more embodiments, the snapshot difference report includes a listing of files and/or folders that were renamed in the source data since the previous snapshot was taken. In one or more embodiments, the snapshot difference report includes a listing of files and/or folders that were added to the source data (i.e., created) since the previous snapshot was taken. In one or more embodiments, the snapshot difference report includes a listing of the files and/or folders that were modified in the source data since the previous snapshot was taken. Modification of a file and/or folder of the source data may include, but is not limited to, changing the content of the file and/or folder, altering metadata (e.g., permissions, attributes, etc.) associated with the folder, or any combination thereof.

In one or more embodiments, the snapshot difference report is first used to determine which files and/or folders were deleted from the source data since the last backup, and such files and/or folders are deleted from the copy of the previous backup in the data domain. Next, in one or more embodiments, the snapshot difference report is used to determine which files and/or folders of the source data were renamed since the last backup, and such files and/or folders are correspondingly renamed in the copy of the previous backup in the data domain. In one or more embodiments, at this point in the process, all deletes and renames that have occurred in the source data since the last backup are reflected in the copy of the backup in the target data domain, without having to have copied any of the files and/or folders from the source device(s) to the data domain.

In one or more embodiments, using the generated snapshot difference report, three lists are created. In one or more embodiments, the first list includes entries of deleted files and/or folders. In one or more embodiments, the second list includes the entries of renamed files and/or folders. In one or more embodiments, the third list includes entries of created and/or modified files and/or folders. In one or more embodiments, these lists are used to perform the synthetic full backup.

Next, in one or more embodiments, the snapshot difference report is used to identify all files and/or folders that were created and/or modified since the last backup was performed. In one or more embodiments, the copied and/or modified files and/or folders are added to a copy list. In one or more embodiments, the copy list is used as input for a copy operation, which copies the files and/or folders of the copy list to the copy of the previous backup in the data domain. In one or more embodiments, during the copy operation, the created files and/or folders are added to the backup on data domain, and the modified files and/or folders are overwritten. In one or more embodiments, any permissions and/or attributes for the created and/or modified files are also associated with the copies of the files and/or folders in the data domain backup copy of the source data. In one or more embodiments, after the delete operation, the rename operation, and the copy operation for the created and/or modified files and/or folders, the copy of the previous backup in the data domain has been transformed into a synthetic full backup of the current state of the source data, with the only actual copying of the source data being the copying of the created and/or modified files and/or folders. In one or more embodiments, after the successful synthetic full backup, metadata of this synthetic full backup is updated, which will be used to verify the status of this backup during the next synthetic full backup cycle.

In Step 310, a copy of a previous backup is stored in the data domain. In one or more embodiments, the copy of the previous backup is a copy of the backup created using the previous snapshot. In one or more embodiments, the copy of the previous backup is a copy of the initial full backup. In one or more embodiments, the copy of the previous backup is a copy of the last synthetic full backup.

In Step 312, a delete operation is performed on the copy of the previous backup based on the snapshot difference report. In one or more embodiments, the delete operation is performed on the copy of the previous backup by the source device agent. In one or more embodiments, the delete operation includes deleting from the copy of the previous backup all the files and/or folders listed as deleted in the snapshot difference report generated in Step 308.

In Step 314, a rename operation is performed on the copy of the previous backup based on the snapshot difference report. In one or more embodiments, the rename operation is performed on the copy of the previous backup by the source device agent. In one or more embodiments, the rename operation includes renaming files and/or folders in the copy of the previous backup based on the listing of renamed files and/or folders in the snapshot difference report generated in Step 308 (see e.g., FIGS. 3B and 3C for additional details about one or more embodiments of Step 308).

In Step 316, a copy operation is performed on the copy of the previous backup based on the snapshot difference report. In one or more embodiments, the copy operation is performed on the copy of the previous backup by the source device agent. In one or more embodiments, the copy operation includes adding to the copy of the previous backup all files and/or folders listed as created in the snapshot difference report generated in Step 308. In one or more embodiments, the copy operation includes overwriting any files and/or folders in the copy of the previous backup that are listed as modified in the snapshot difference report. In one or more embodiments, overwriting the modified files and/or folders in the copy of the previous backup causes the files and/or folders, after the overwriting, to be modified in the same way that the source data was modified, including changes to the content of the files and/or folders and to any metadata associated with the files and/or folders.

In one or more embodiments, after Step 316, the method ends, and the copy of the previous backup in the data domain has been transformed into a new synthetic full backup of the source data corresponding to the point-in-time at which the second snapshot was taken in Step 306. In one or more embodiments, a synthetic full backup is equivalent to a full backup of source data at a point-in-time, without having to copy all of the source data to a data domain, which is achieved using a snapshot difference report to perform operations on a copy of a previous backup. In one or more embodiments, a synthetic full backup may be used, for example, to restore the source data to the point-in-time copy of the source data represented by the synthetic full backup. Such a restoration need not include, for example, any lookups or amalgamation of incremental backups, as the synthetic full backup includes a copy of all of the source data.

In one or more embodiments, the create and modify operations require the copy of the previous backup to be performed; however, the delete and rename operations may not require the copy of the previous backup to be performed, where they may directly be performed on the previous backup. By this way, in particular, the rename operation may be performed more efficient.

Referring to FIGS. 3B and 3C, which provide additional detail about Step 308 in accordance with one or more embodiments of the invention. In Step 320, a rename list, which includes the list of rename entries (e.g., files, folders, etc.), is obtained from the generated snapshot difference report in Step 308 in FIG. 3A. In one or more embodiments, after obtaining the rename list, which may include circular rename entries (e.g., rename f1 to f2, rename f2 to f3, and rename f3 to f1), presence of a rename source (i.e., the file and/or folder that is going to be used to perform the rename operation) in a rename target (i.e., the file and/or folder that is requested to be renamed) is checked. In one or more embodiments, if the rename source exists in the rename target, this will cause a circular renaming chain (e.g., rename f1 to f2, rename f2 to f3, and rename f3 to f1). In one or more embodiments, the circular renaming chain may need to be broken by adding a temporary target path (see e.g. Step 328 in FIG. 3B) to perform a successful rename operation.

In Step 322, all the rename entries in the rename list are sorted to obtain an ordered rename list. In one or more embodiments, each rename entry specifies a path. The rename entries are ordered such that all rename entries corresponding to parent paths are order prior to (or before) rename entries corresponding to child paths. For example, rename entries for paths dir1 and dir2 and ordered prior to rename entries for the child paths dir1/sub1 and dir2/sub2.

In Step 324, a determination is made about whether the circular rename entries exist in the ordered rename list. If the result of the determination is YES, which indicates the circular rename entries exist in the rename list, the method proceeds to Step 326 in FIG. 3B to perform the rename operation. If the result of the determination is NO, which indicates the circular rename entries do not exist in the rename list, the method proceeds to Step 334 in FIG. 3B to perform the rename operation.

In Step 326, if the parent path of the target path is already renamed, the target path is changed to the renamed target path. Said another way, when the parent path of the target path is already renamed (e.g., from dir1 to dir2), the target path is renamed (e.g., from dir1/sub1 to dir2/sub1) as well. In one or more embodiments, the rename operation is performed entry by entry and the source device agent keeps track of what was renamed. In one or more embodiments, because the source device agent is aware that the parent path of the target path is renamed, the renaming of the child path (e.g., sub1, sub2, etc.) will follow the same sequence to make sure that the child path, whose parent path was already renamed, is accurately renamed. If the parent path of the target path is not renamed, the method proceeds to Step 328.

In Step 328, a suffix (e.g., "_tmp" as "temporary") is appended to each file and/or folder in the target path to create a temporary target path (or a renamed target path). For example, dir1/sub1/f1 is renamed to dir1/sub1/f1_tmp. In one or more embodiments, the point of appending "_tmp" to the target path is to break the circular rename operation chain. In one or more embodiments, by this way, the files and/or folder are not directly renamed to the target path. Further, because of the created temporary target path (or the renamed target path), the target path will not have the same entries listed in the source path such that the original content of the files and/or folder are preserved.

Continuing with the discussion of FIG. 3B, in Step 330, if the parent path of the source path is already renamed, the source path is changed to the renamed source path. Said another way, when the parent path of the source path is already renamed (e.g., from dir1 to dir2), the source path is renamed (e.g., from dir1/sub1 to dir2/sub1) as well. In one or more embodiments, the rename operation is performed entry by entry and the source device agent keeps track of what was renamed. In one or more embodiments, because the source device agent is aware of that the parent path of the source path is renamed, the renaming of the child path (e.g., sub1, sub2, etc.) will follow the same sequence to make sure that the child path, whose parent path was already renamed, is accurately renamed. If the parent path of the source path is not renamed, the method proceeds to Step 332.

In Step 332, a temporary rename list of rename operations is created by using the source path and temporary target path pairs and the rename list (from Step 322). In one or more embodiments, a mapping (i.e., pseudo renaming) from original source path (e.g., dir1/sub141) to the temporary target path (e.g., dir1/sub1/f2_tmp) is performed. In one or more embodiments, by creating the temporary rename list, the created temporary target paths for all the target paths can be tracked.

Referring to FIG. 3C, in Step 340, a circular rename list of rename operations is created by using the temporary target path and target path pairs. In one or more embodiments, a mapping (i.e., pseudo renaming) from temporary target path (e.g., dir1/sub1/f2_tmp) to the target path (e.g., dir1/sub1/f2) is performed.

In Step 342, as a first part of a two-step rename operation, rename operations are performed in the temporary rename list. In one or more embodiments, renaming from the original source path (e.g., dir1/sub1/f1) to the temporary target path (e.g., dir1/sub1/f2_tmp) is performed. In one or more embodiments, by renaming the original source path to the temporary target path first, the original files/and or folders (e.g., f1, f2, f3, etc.) in the original source path are preserved.

In Step 344, as a second part of the two-step rename operation, rename operations are performed in the circular rename list. In one or more embodiments, the files and/or folders (e.g., f1_tmp, f2_tmp, f3_tmp, etc.) are renamed from the temporary target path to the target path. In one or more embodiments, the temporary target path now behaves as a source path and the target path now behaves as a target path, where the rename operation is performed from the source path to the target path. In one or more embodiments, by this way, the files and/or folders in the temporary target path are renamed to the target path as f1, f2, f3, etc.

In one or more embodiments, with the help of Steps 326-332 in FIG. 3B and Steps 340-344 in FIG. 3C, generation of the circular renaming and overwriting of files and/or folders are prevented, because the target path does not have the same entries listed in the source path.

After the successful rename operations in the circular rename list in Step 344, the method ends.

Turning to FIG. 3B, in Step 334, if the parent path of the source path is already renamed, the source path is changed to the renamed source path. Said another way, when the parent path of the source path is already renamed (e.g., from dir1 to dir2), the source path is renamed (e.g., from dir1/sub1 to dir2/sub1) as well. In one or more embodiments, the rename operation is performed entry by entry and the source device agent keeps track of what was renamed. In one or more embodiments, because the source device agent is aware of that the parent path of the source path is renamed, the renaming of the child path (e.g., sub1, sub2, etc.) will follow the same sequence to make sure that the child path, whose parent path was already renamed, is accurately renamed. If the parent path of the source path is not renamed, the method proceeds to Step 336.

In Step 336, the rename list is updated based on the changes in the source path. If the parent path of the source path is not already renamed in Step 334, the method proceeds to Step 338 without updating the rename list.

In Step 338, rename operations are perform in the rename list. In one or more embodiments, the entries in the source path are renamed to the target path. In one or more embodiments, the procedure discussed between Steps 334 and 338 is the simplified version of the produce discussed between Steps 326-332 in FIG. 3B and Steps 340-344 in FIG. 3C, because the procedure discussed between Steps 334 and 338 does not include any entry with "tmp" and/or circular rename.

After the successful rename operations in the rename list in Step 338, the method ends.

Example

The above describes systems and methods for renaming operation during differential based backups in accordance with one or more embodiments of the invention. Such embodiments may be used for renaming any amount and any type of source data of any number of source nodes, and storing the one or more synthetic full backups in a data domain. However, for the sake of brevity and simplicity, consider the following simplified scenario to illustrate at least a portion of the concepts described herein. The example is not intended to limit the scope of the embodiments and/or the claims of the instant application.

Consider a scenario in which a device ecosystem includes a Hadoop cluster of virtual machines (i.e., source nodes) and an associated HDFS (i.e., source data). In such a scenario, at a point in time, a first snapshot is taken of the HDFS by a source device agent executing on one of the virtual machines of the cluster. The first snapshot is used to generate an initial full backup of the HDFS to a data domain. Due to the size of the HDFS, the initial full backup takes a long time to perform, and consumes a considerable amount of compute resources. During the initial full backup, all of the files and/or folders of the HDFS are copied to the data domain.

A backup schedule is configured for the HDFS that triggers (i.e., requests) a backup to be performed every twelve hours. However, the initial full backup took longer than twelve hours to perform, due to the amount of data that had to be copied from the HDFS to the data domain. In order to meet the backup schedule, techniques described herein are used to reduce the time necessary for backing up the HDFS by generating synthetic full backups at the scheduled times instead of full backups. As discussed above, a synthetic full backup is equivalent to a full backup of source data at a point-in-time, without having to copy all of the source data to a data domain, which is achieved using a snapshot difference report to perform operations on a copy of a previous backup. In one or more embodiments, a synthetic full backup may be used, for example, to restore the source data to the point in time copy of the source data represented by the synthetic full backup. Such a restoration need not include, for example, any lookups or amalgamation of incremental backups, as the synthetic full backup includes a copy of all of the source data.

To generate a synthetic full backup at the first scheduled backup time after the initial full backup, a source device agent executing in the Hadoop cluster obtains a first snapshot associated with the initial full backup, and a second snapshot of the current state of the HDFS. Next, the source device agent uses the two snapshots to generate a snapshot difference report. The snapshot difference report includes listings of files and/or folders that were deleted from the source data in the time between the two snapshots, renamed in the source data in the time between the two snapshots, created in (i.e., added to) the source data in the time between the two snapshots, and modified in the source data in the time between the two snapshots.

Next, the source device agent uses the listing of renamed files and/or folders in the snapshot difference report to rename files and/or folders in the copy of the initial full backup (i.e., performing a rename operation). In this example, assume that the ordered rename list in the snapshot difference report includes the following ordered rename entries: 1. "rename S/dir1/sub141 to T/dir1/sub1/f2, 2. rename S/dir1/sub142 to T/dir1/sub1/f3, and 3. rename S/dir1/sub143 to T/dir1/sub1/f1", as a circular rename operation. Here, "S" represents the source path of the rename operation and "T" represents the target path of the rename operation.

Next, "_tmp" suffix is appended to each file and/or folder in the target path (e.g., T/dir1/sub1/f2_tmp, T/dir1/sub1/f3_tmp, and T/dir1/sub1/f1_tmp) of the rename operation to create a temporary target path (or a renamed target path) (e.g., T/dir1/sub142 tmp, T/dir1/sub1/f3_tmp, and T/dir1/sub1/f1_tmp). In this example, assume that the parent path (S/dir1) of the source path (S/dir1/sub1/f1) is not renamed. Next, the following ordered temporary rename list of the rename operations listed in the rename list of the snapshot difference report is created: 1. rename f1 to f2_tmp, 2. rename f2 to f3_tmp, 3. rename f3 to f1_tmp.

Next, the following order circular rename list of rename operations is created: 1. rename f2_tmp to f2, 2. rename f3_tmp to f3, 3. rename f1_tmp to f1. Next, as a first part of a two-step rename operation, rename operations are performed in an order specified by the ordered temporary rename list. First, renaming from the original source path to the temporary target path (e.g., rename f1 to f2_tmp, rename f2 to f3_tmp, rename f3 to f1_tmp) is performed. Then, as a second part of the two-step rename operation, rename operations are performed in an order specified by the circular rename list, where renaming from the temporary target path to the original target path (e.g., rename f2_tmp to f2, rename f3_tmp to f3, rename f1_tmp to f1) is performed. In the second part of the two-step rename operation, the temporary target path behaves as a source path and the original target path behaves as a target path.

In this example, assume that f1=10, f2=20, and f3=30. As mentioned above, first, f1 is renamed to f2_tmp (now, f2_tmp=10), f2 is renamed to f3_tmp (now, f3_tmp=20), and f3 is renamed to f1_tmp (now, f1_tmp=30). Then, f2_tmp is renamed to f2 (now, f2=10), f3_tmp is renamed to f3 (now, f3=20), and f1_tmp is renamed to f1 (now, f1=30). As indicated, using one or more embodiments of the invention, the rename operation, for example, from f1 to f2 is performed successfully (where f2 in the target path is now 10 and the f2 in the original source path is still 20, not 10) and the entries (e.g., files, folders, etc.) in the original source path are preserved, not overwritten.

The next time a backup is scheduled to occur in this scenario (i.e., twelve hours later), a similar process is performed to ensure a successful synthetic full backup. This process may be repeated for as long as the backup schedule for the HDFS is being run, thereby generating any number of synthetic full backups of the source data at different points-in-time without having to copy the source data in its entirety or, when a restore operation is requested, waste the resources necessary to amalgamate incremental backups to perform the restore of the HDFS.

End of Example

Figure 4:
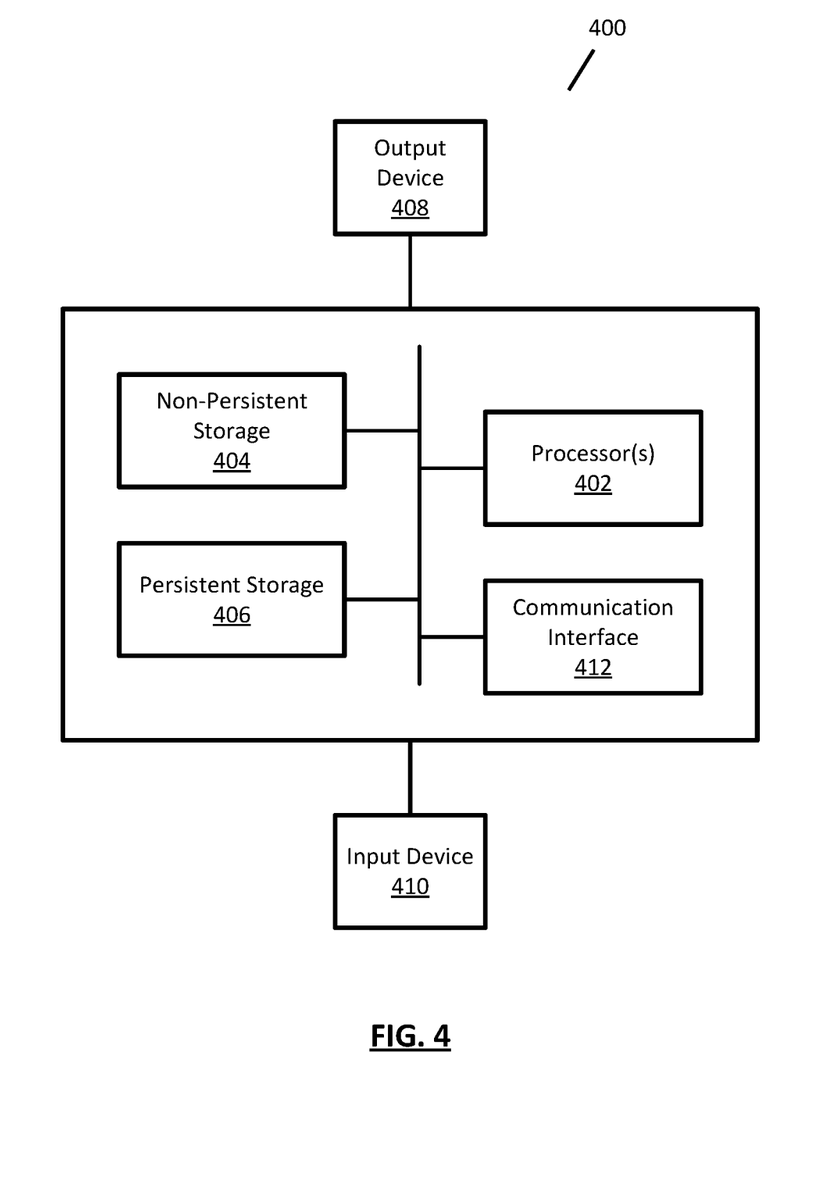
FIG. 4 shows a computing system in accordance with one or more embodiments described herein.

As discussed above, embodiments described herein may be implemented using computing devices. FIG. 4 shows a diagram of a computing device in accordance with one or more embodiments described herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN), such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing rename operations, the method comprising:
   obtaining a rename list from a snapshot difference report;
   sorting the rename list to obtain an ordered rename list, wherein the ordered rename list comprises rename entries in an operation sequence;
   making a determination, using the ordered rename list, that circular rename entries exist in the ordered rename list;
   based on the determination:
      creating a plurality of temporary target paths based on the circular rename entries, wherein the plurality of temporary target paths is created to break a circular rename operation chain;
      generating a temporary rename list of the rename operations, wherein the temporary rename list comprises a plurality of (source path, temporary target path) pairs, wherein a source path in each of the of (source path, temporary target path) pairs is obtained from the ordered rename list;
      generating a circular rename list of the rename operations, wherein the circular rename list comprises a plurality of (temporary target path, target path) pairs, wherein a target path in each of the of (temporary target path, target path) pairs is obtained from the ordered rename list, wherein the target path and a temporary target path are located in a target data domain;
      performing rename operations in the temporary rename list; and
      after completing operations in the temporary rename list, performing rename operations in the circular rename list, wherein performing the rename operations in the temporary rename list and performing the rename operations in the circular rename list preserve a content of source data.

2. The method of claim 1, further comprising:
   before obtaining the rename list, generating the snapshot difference report using a first snapshot associated with a previous backup of the source data and a second snapshot associated with a current state of the source data, wherein the snapshot difference report comprises a delete list, the rename list, and a copy list.

3. The method of claim 2, wherein the source data is a Hadoop Distributed File System (HDFS).

4. The method of claim 2, wherein the previous backup is one selected from a group consisting of an initial full backup and a second synthetic full backup.

5. The method of claim 1, further comprising:
   before creating the plurality of temporary target paths:
      making a second determination that a parent path of the target path is already renamed; and
      based on the second determination:
         changing the target path to a renamed target path.

6. The method of claim 1, further comprising:
   before generating the temporary rename list:
      making a second determination that a parent path of a source path is already renamed; and
      based on the second determination:
         changing the source path to a renamed source path.

7. The method of claim 1, wherein the temporary rename list comprises rename entries in the operation sequence.

8. A non-transitory computer readable medium comprising computer readable program code, which when executed by a computer processor enables the computer processor to perform a method for performing rename operations, the method comprising:
   obtaining a rename list from a snapshot difference report;
   sorting the rename list to obtain an ordered rename list, wherein the ordered rename list comprises rename entries in an operation sequence;

making a determination, using the ordered rename list, that circular rename entries exist in the ordered rename list;
based on the determination:
creating a plurality of temporary target paths based on the circular rename entries, wherein the plurality of temporary target paths is created to break a circular rename operation chain;
generating a temporary rename list of the rename operations, wherein the temporary rename list comprises a plurality of (source path, temporary target path) pairs, wherein a source path in each of the of (source path, temporary target path) pairs is obtained from the ordered rename list;
generating a circular rename list of the rename operations, wherein the circular rename list comprises a plurality of (temporary target path, target path) pairs, wherein a target path in each of the of (temporary target path, target path) pairs is obtained from the ordered rename list, wherein the target path and a temporary target path are located in a target data domain;
performing rename operations in the temporary rename list; and
after completing operations in the temporary rename list, performing rename operations in the circular rename list, wherein performing the rename operations in the temporary rename list and performing the rename operations in the circular rename list preserve a content of source data.

9. The non-transitory computer readable medium of claim 8, further comprising:
before obtaining the rename list, generating the snapshot difference report using a first snapshot associated with a previous backup of the source data and a second snapshot associated with a current state of the source data, wherein the snapshot difference report comprises a delete list, the rename list, and a copy list.

10. The non-transitory computer readable medium of claim 9, wherein the source data is a Hadoop Distributed File System (HDFS).

11. The non-transitory computer readable medium of claim 9, wherein the previous backup is one selected from a group consisting of an initial full backup and a second synthetic full backup.

12. The non-transitory computer readable medium of claim 8, further comprising:
before creating the plurality of temporary target paths:
making a second determination that a parent path of the target path is already renamed; and
based on the second determination:
changing the target path to a renamed target path.

13. The non-transitory computer readable medium of claim 8, further comprising:
before generating the temporary rename list:
making a second determination that a parent path of a source path is already renamed; and
based on the second determination:
changing the source path to a renamed source path.

14. The non-transitory computer readable medium of claim 8, wherein the temporary rename list comprises rename entries in the operation sequence.

15. A system for performing rename operations, the system comprising:
a processor comprising circuitry;
memory; and
a source node operatively connected to a target data domain, executing on the processor and using the memory, and configured to:
obtain a rename list from a snapshot difference report;
sort the rename list to obtain an ordered rename list, wherein the ordered rename list comprises rename entries in an operation sequence;
make a determination, using the ordered rename list, that circular rename entries exist in the ordered rename list;
based on the determination:
create a plurality of temporary target paths based on the circular rename entries, wherein the plurality of temporary target paths is created to break a circular rename operation chain;
generate a temporary rename list of the rename operations, wherein the temporary rename list comprises a plurality of (source path, temporary target path) pairs, wherein a source path in each of the of (source path, temporary target path) pairs is obtained from the ordered rename list;
generate a circular rename list of the rename operations, wherein the circular rename list comprises a plurality of (temporary target path, target path) pairs, wherein a target path in each of the of (temporary target path, target path) pairs is obtained from the ordered rename list, wherein the target path and a temporary target path are located in the target data domain;
perform rename operations in the temporary rename list; and
after completing operations in the temporary rename list, perform rename operations in the circular rename list, wherein performing the rename operations in the temporary rename list and performing the rename operations in the circular rename list preserve a content of source data.

16. The system of claim 15, wherein the source node is further configured to:
before obtaining the rename list, generate the snapshot difference report using a first snapshot associated with a previous backup of the source data and a second snapshot associated with a current state of the source data, wherein the snapshot difference report comprises a delete list, the rename list, and a copy list.

17. The system of claim 16, wherein the source data is a Hadoop Distributed File System (HDFS).

18. The system of claim 16, wherein the previous backup is one selected from a group consisting of an initial full backup and a second synthetic full backup.

19. The system of claim 15, wherein the source node is further configured to: before creating the plurality of temporary target paths:
make a second determination that a parent path of the target path is already renamed; and
based on the second determination:
change the target path to a renamed target path.

20. The system of claim 15, wherein the source node is further configured to:
before generating the temporary rename list:
make a second determination that a parent path of a source path is already renamed; and
based on the second determination:
change the source path to a renamed source path.

* * * * *